United States Patent [19]

Mizuno et al.

[11] 4,112,759
[45] Sep. 12, 1978

[54] DEVICE FOR DETECTING THE SURFACE LEVEL OF MOLTEN METAL IN A MOLD

[75] Inventors: Michitaka Mizuno; Kazuo Ideue; Masashi Oya, all of Hiroshima, Japan

[73] Assignee: Mitsubishi Jukogyo Kabushiki Kaisha, Tokyo, Japan

[21] Appl. No.: 741,019

[22] Filed: Nov. 11, 1976

[30] Foreign Application Priority Data

Nov. 20, 1975 [JP] Japan .......................... 50-156854[U]

[51] Int. Cl.² .............................................. G01F 23/26
[52] U.S. Cl. ................................................... 73/295
[58] Field of Search ............... 73/290 R, 295, 362 CP, 73/DIG. 5; 324/34 TE; 335/208; 336/57; 340/228 F

[56] References Cited
U.S. PATENT DOCUMENTS

| 1,945,378 | 1/1934 | Robbins ........................ 73/362 R X |
| 2,350,329 | 6/1944 | Hornfeck ...................... 73/362 CP |
| 3,089,337 | 5/1963 | Cutsogeorge ................ 73/295 |
| 3,220,258 | 11/1965 | Rod ............................... 73/290 R |
| 3,848,466 | 11/1974 | Dial et al. ................... 324/34 TE X |
| 3,891,861 | 6/1975 | Weber et al. ............... 73/362 CP X |
| 3,936,734 | 2/1976 | Brandli et al. .............. 73/362 R X |

Primary Examiner—S. Clement Swisher
Attorney, Agent, or Firm—Wenderoth, Lind & Ponack

[57] ABSTRACT

A device for detecting the surface level of molten metal in a mold, in which a thermo-sensitive magnetic element the relative magnetic permeability of which varies depending upon temperature is provided on an outer wall surface of the mold, and a coil connected to an A. C. power supply is mounted so as to leave a gap between the thermo-sensitive magnetic element and the coil, so that variation in electromagnetic coupling between the coil and the thermo-sensitive magnetic element due to temperature increase of the mold according to the rise of molten metal level can be detected.

5 Claims, 6 Drawing Figures

DEVICE FOR DETECTING THE SURFACE LEVEL OF MOLTEN METAL IN A MOLD

DETAILED DESCRIPTION OF THE INVENTION

The present invention relates to a device for detecting the surface level of molten metal in a mold of a continuous casting apparatus or the like, which device employs a thermo-sensitive magnetic element the relative magnetic permeability of which varies depending upon temperature.

Heretofore, as a device for detecting the surface level of molten metal in a mold, there has been used a device such as shown in FIG. 1, in which a thermo-sensitive magnetic element 2, such as a substance of MS alloy (30–35% Ni, 7–10% Cr, and the remainder Fe) or the like, the relative magnetic permeability of which varies depending upon temperature and a magnet 3, the Curie point of which is higher than that of said thermo-sensitive magnetic element 2 are embedded in juxtaposition to each other in an outer wall surface of a mold 1, so that when the temperature of the thermo-sensitive magnetic element 2 varies in response to variation in the molten metal surface level in said mold 1, the magnetic flux between body 2 and magnet 3 varies due to the variation in a relative magnetic permeability of said thermo-sensitive magnetic element 2, and the surface level of the molten metal in the mold 1 is detected by detecting the magnetic flux variation caused by the temperature variation of said thermo-sensitive magnetic element 2 by means of a magnetic flux detector 4.

However, the above-described device has a disadvantage that when a slag removing rod or the like (not shown), for example, is inserted into the mold 1 to remove slag within the mold, magnetic flux emanating from the magnet 3 will leak through the slag removing rod because the slag removing rod is made of magnetic material such as iron, and thereby a large error will be caused in the detection of the surface level of the molten metal. Furthermore, if said magnet 3 is demagnetized during a long period of time, then the magnetic flux through the thermo-sensitive magnetic element 2 is varied, resulting in a disadvantage that the detection error in detecting the surface level of the molten metal will be increased further.

OBJECT AND BRIEF SUMMARY OF THE INVENTION

One object of the present invention is to provide a device for detecting the surface level of the molten metal in a mold, in which the magnetic field does not leak out to the molten metal side of the mold, in which even if a magnetic material slag removing rod is inserted into the mold, the magnetic flux will not be affected by the slag removing rod, and in which the detection error is reduced to a very small value by detecting an alternating magnetic flux variation without employing a magnet, whereby the disadvantages of the prior art detector are overcome.

This object is achieved according to the present invention by the provision of a device for detecting the surface level of molten metal in a mold in which a thermo-sensitive magnetic element the relative magnetic permeability of which varies depending upon temperature is provided on an outer wall surface of the mold, and a coil connected to an A. C. power supply is mounted adjacent to the magnetic body so as to leave a gap between said thermo-sensitive magnetic element and said coil so that variation in the electromagnetic coupling between said thermosensitive magnetic element and said coil can be detected.

DETAILED DESCRIPTION OF THE INVENTION

Figure 1:
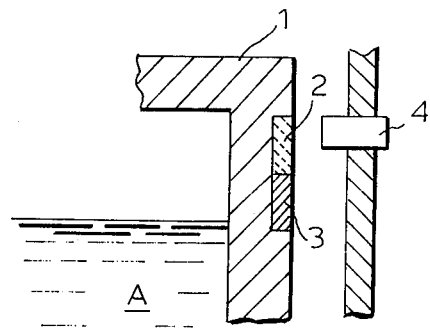
FIG. 1 is a schematic cross-sectional view of a device for detecting the surface level of molten metal in a mold according to the prior art.
Figure 2:
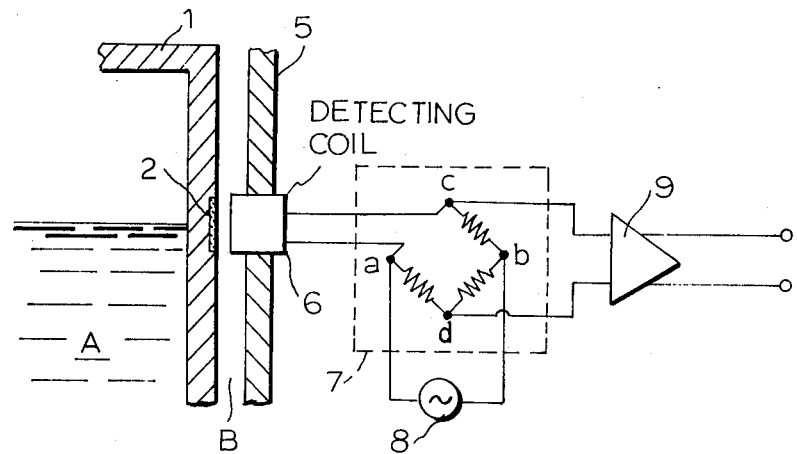
FIG. 2 is a schematic view, partly in section, of one preferred embodiment of the molten metal surface detecting device according to the present invention.
Figure 3:
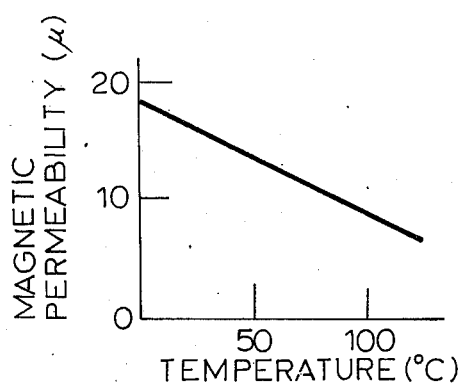
FIG. 3 is a graph of the variation of magnetic permeability of the thermo-sensitive magnetic element in FIG. 2 caused by temperature variation.
Figure 4:
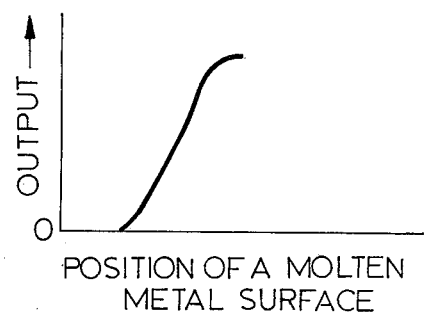
FIG. 4 is a graph of the output variation of an amplifier caused by a variation in the surface level of molten metal when the molten metal surface detecting device of FIG. 2 is used.

The present invention will now be described in connection with one preferred embodiment shown in FIGS. 2 through 4. In FIG. 2, reference numeral 2 designates a thermo-sensitive magnetic element soldered on an outer wall surface of a mold 1 into which molten metal A has been poured. This thermo-sensitive magnetic element 2 is made of a so-called thermo-sensitive magnetic material the relative magnetic permeability of which varies depending upon temperature, such as MS alloy (30–35% Ni, 7–10% Cr and the remainder Fe), Monel alloy (67% Ni, 30% Cu, 1.5% Fe and the remainder Mn, Zn, Si, Al, etc.), Calmalloy (67.8% Ni, 2.2% Fe and 30% Co), Thermoperm (30% Ni and the remainder Fe), etc., and it has a Curie point not exceeding the softening point of the metal of which the mold 1 is formed. The outside of the mold 1 on which said thermo-sensitive magnetic element 2 is mounted, is covered by a jacket 5, and a gap is provided between said mold 1 and the jacket 5 through which a water coolant B flows. In addition, in said jacket 5 is disposed a coil 6 at a position opposed to said thermo-sensitive magnetic element 2, and this coil 6 is connected in a bridge circuit 7 as one arm thereof. Connected across terminals $a$ and $b$ of this bridge circuit 7 is an A. C. power supply 8, while connected across terminals $c$ and $d$ thereof is an amplifier 9. In this case, although the frequency of the A. C. power supply 8 is not specifically limited, normally frequencies on the order of 1–100 kHz are employed.

The operation of the device for detecting the surface level of the molten metal, constructed as described above, will be described. At first, the three arms of the bridge circuit 7 other than the coil 6 are preliminarily adjusted so that no voltage appears between the output terminals $c$ and $d$ of the bridge circuit 7 in the state where the interior of the mold 1 is empty. Subsequently, when molten metal A is poured into the mold 1, the temperature of the mold 1 varies, and in response to this temperature variation the relative magnetic permeability of the thermo-sensitive magnetic element 2 provided on the outer wall surface of the mold varies, for example, as shown in FIG. 3. Owing to this variation, the magnetic flux through the thermosensitive magnetic element 2 varies, so that the electromagnetic coupling between the coil 6 forming one arm of said bridge circuit 7 and the thermo-sensitive magnetic element 2 varies, resulting in a variation in the current flowing through the coil 6. As a result, a deviation voltage appears between the terminals c and d of the bridge circuit 7, and if this deviation voltage is amplified by the amplifier 9, then the output of the amplifier 9 will vary depending upon the position of the molten metal surface, as shown in FIG. 4. Accordingly, by utilizing this output value, the position of the molten metal surface can be detected.

It is to be noted that in this case the depth of penetration δ of the A. C. magnetic field generated by the coil into the material of the mold 1 is represented by the following equation:

$$\delta = \sqrt{\frac{2}{\omega \mu \sigma}}$$

where $\omega$ is the angular frequency of the current flowing through the coil, $\mu$ is the relative magnetic permeability of the mold, and $\sigma$ is the conductivity of the mold. Therefore, by selecting the frequency of the current flowing through the coil to be a high frequency, the depth of penetration of the magnetic field can be made small so that almost no magnetic flux will pass through the portion of the mold 1 on the molten metal side, and accordingly, the coil 6 will not be affected by a slag removing rod or the like that is inserted into the mold 1.

Figure 5:
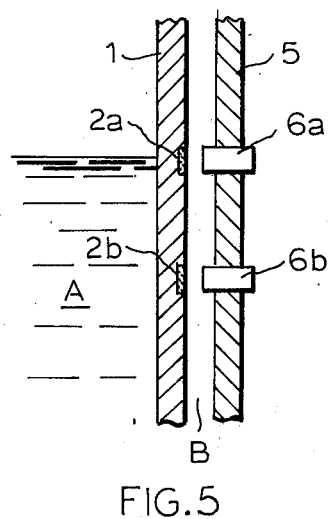
FIG. 5 is a cross-sectional view of another preferred embodiment of a molten metal surface detecting device according to the present invention.

The present invention is not limited to the above-described embodiment, but can be embodied, for example, as shown in FIG. 5, in which a plurality of thermo-sensitive magnetic elements, here shown as two such elements 2a and 2b, are disposed at a plurality of positions on the side wall of the mold 1, being disposed one above the other, and coils 6a and 6b are respectively provided in positions opposed to these thermo-sensitive magnetic elements 2a and 2b. With this arrangement, the surface level of the molten metal can be detected over a wider range as shown by a curve e in FIG. 6.

Figure 6:
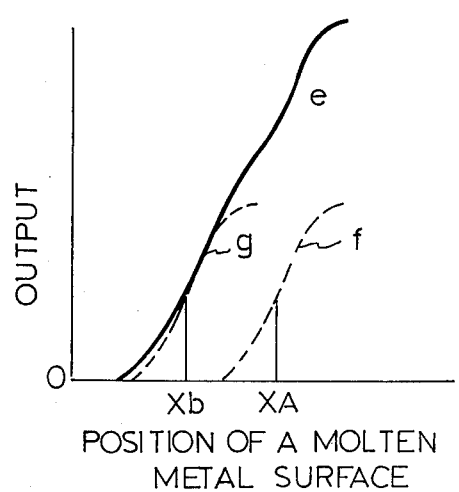
FIG. 6 is a graph showing the output variation of an amplifier caused by a variation in the molten metal surface level when the molten metal surface detecting device of FIG. 5 is used.

It is to be noted that in FIG. 6 a curve f shows the output variation caused by variation in the surface level of the molten metal as detected by the coil 6a, while the curve g shows the output variation caused by variation in the surface level as detected by the coil 6b, and indices $X_A$ and $X_b$ shown in the figure indicate the surface levels corresponding to the positions of said thermo-sensitive magnetic elements 2a and 2b, respectively.

As described above, according to the present invention, the surface level of the molten metal is detected by detecting the variation in the electromagnetic coupling between a coil through which an A. C. current flows and a thermo-sensitive magnetic element, so that the magnetic field does not leak to the molten metal side of the mold, and even if a slag removing rod is inserted into the mold, the level detection will not be affected by the slag removing rod. In addition, since the device according to the present invention employs no magnet, demagnetization will not occur and the magnetic properties of the device will not vary. Accordingly, remarkable advantages are obtained, such that the detection error in detecting the surface level of the molten metal becomes very small.

What is claimed is:

1. A device for detecting the surface level of molten metal in a mold, comprising at least one thermosensitive magnetic element which undergoes variations in the relative magnetic permeability depending on temperature in the range of temperature of the mold at all levels of molten metal therein and mounted on the outer wall surface of the mold, at least one coil positioned opposite to said magnetic element and spaced slightly therefrom to leave a gap between the magnetic element and the coil, an A.C. power supply coupled to said coil having a frequency for causing substantially none of the magnetic field of said at least one coil to penetrate the mold into the molten metal, and means of sensing variations in the electromagnetic coupling between the magnetic element and said coil.

2. A device as claimed in claim 1 in which there is a single magnetic element and a single coil.

3. A device as claimed in claim 1 in which there is a plurality of magnetic elements and a plurality of coils positioned opposite to the responsive magnetic elements, the magnetic elements being spaced along the outer wall surface of the mold in the vertical direction.

4. A device as claimed in claim 1, in which the thermo-sensitive magnetic element is a material the Curie point of which does not exceed the softening temperature of the metal of which the mold is formed.

5. A device as claimed in claim 4, in which said magnetic material, has a coefficient of the change of specific magnetic permeability in accordance with a change in temperature which is greatest in the vicinity of room temperature.

* * * * *